(12) United States Patent
Kennedy et al.

(10) Patent No.: US 9,091,748 B2
(45) Date of Patent: Jul. 28, 2015

(54) METHODS AND APPARATUS FOR 3D UV IMAGING

(75) Inventors: Adam M. Kennedy, Santa Barbara, CA (US); Michael D. Jack, Goleta, CA (US); James Asbrock, Oceanside, CA (US); Frank B. Jaworski, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 674 days.

(21) Appl. No.: 13/449,637

(22) Filed: Apr. 18, 2012

(65) Prior Publication Data

US 2013/0278716 A1   Oct. 24, 2013

(51) Int. Cl.
*H04N 13/02* (2006.01)
*G01S 7/486* (2006.01)
*G01S 17/89* (2006.01)
*G01S 7/48* (2006.01)

(52) U.S. Cl.
CPC ............. *G01S 7/4861* (2013.01); *G01S 7/4802* (2013.01); *G01S 17/89* (2013.01)

(58) Field of Classification Search
CPC .... H04N 13/0271; G01S 7/4802; G01S 17/89
USPC ......... 348/42, 46, 47, 156, 162; 382/116, 118
See application file for complete search history.

(56) References Cited

U.S. PATENT DOCUMENTS

| | | | |
|---|---|---|---|
| 5,446,286 A | 8/1995 | Bhargava | |
| 5,613,140 A | 3/1997 | Taira | |
| 6,287,928 B1 | 9/2001 | Yamashita | |
| 6,525,337 B1 | 2/2003 | Ugajin et al. | |
| 6,632,694 B2 | 10/2003 | Torvik | |
| 6,927,422 B2 | 8/2005 | Torvik | |
| 7,015,139 B2 | 3/2006 | Yamashita | |
| 7,440,590 B1 * | 10/2008 | Hassebrook et al. | 382/108 |
| 7,449,789 B2 | 11/2008 | Chen | |
| 7,662,659 B2 | 2/2010 | Kobayashi et al. | |
| 7,737,046 B2 | 6/2010 | Takeda et al. | |
| 8,682,041 B2 * | 3/2014 | McCloskey | 382/118 |
| 8,705,808 B2 * | 4/2014 | Determan et al. | 382/117 |
| 2003/0118217 A1 * | 6/2003 | Kondo et al. | 382/117 |
| 2003/0235335 A1 * | 12/2003 | Yukhin et al. | 382/190 |
| 2004/0037450 A1 * | 2/2004 | Bradski | 382/103 |
| 2005/0111705 A1 * | 5/2005 | Waupotitsch et al. | 382/118 |

(Continued)

FOREIGN PATENT DOCUMENTS

WO    9928764 A1    6/1999

OTHER PUBLICATIONS

Luther, Joseph M. et al., "Structural, Optical, and Electrical Properties of Self-Assembled Films of PbSe Nanocrystals Treated with 1,2-Ethanedithiol", ACS NANO, Col. 2, No. 2, Feb. 1, 2008.

*Primary Examiner* — David Harvey
(74) *Attorney, Agent, or Firm* — Lando & Anastasi, LLP

(57) ABSTRACT

A 3D ultraviolet (UV) imaging LADAR system includes a UV source configured to generate a UV interrogation beam, a sensor configured to receive a UV return beam reflected from a target and to produce an electrical signal, and an imaging module coupled to the sensor and configured to receive the electrical signal and to generate a corresponding 3D image of the target. In one example, the sensor includes a down-shifting device configured to down-shift the UV return beam to a down-shifted light beam of a different wavelength, for example, in the visible or SWIR wavelength ranges.

26 Claims, 11 Drawing Sheets

(56) References Cited

U.S. PATENT DOCUMENTS

| | | |
|---|---|---|
| 2007/0064978 A1* | 3/2007 | Chhibber et al. ............. 382/118 |
| 2007/0133844 A1* | 6/2007 | Waehner et al. ............. 382/118 |
| 2007/0206840 A1* | 9/2007 | Jacobson ...................... 382/117 |
| 2008/0315340 A1* | 12/2008 | Harada et al. ................. 257/432 |
| 2010/0001209 A1* | 1/2010 | Osinski et al. ............. 250/459.1 |
| 2010/0239119 A1* | 9/2010 | Bazakos et al. ............. 382/103 |
| 2011/0019055 A1 | 1/2011 | Jaworski et al. |
| 2011/0024612 A1 | 2/2011 | Mintz et al. |
| 2011/0052004 A1* | 3/2011 | Lee et al. ...................... 382/103 |
| 2011/0141453 A1 | 6/2011 | Clement et al. |
| 2011/0156184 A1* | 6/2011 | Ninkov et al. ................. 257/432 |
| 2011/0308605 A1 | 12/2011 | Liu et al. |
| 2012/0080066 A1 | 4/2012 | Tsakalakos et al. |
| 2012/0126354 A1 | 5/2012 | Jaworski et al. |
| 2012/0229650 A1* | 9/2012 | Matthews ...................... 348/164 |
| 2013/0107010 A1* | 5/2013 | Hoiem et al. ................... 348/47 |
| 2013/0188083 A1* | 7/2013 | Braithwaite et al. ...... 348/333.01 |
| 2013/0249301 A1* | 9/2013 | Smoot et al. ................... 307/104 |
| 2013/0278787 A1* | 10/2013 | Shpunt ....................... 348/218.1 |

\* cited by examiner

METHODS AND APPARATUS FOR 3D UV IMAGING

BACKGROUND

There are various existing imaging technologies that use visible or infrared (IR) light to scan an individual's face or portion thereof (e.g., the iris of the eye) to obtain images that can be processed for identification. However, these systems have various limitations or drawbacks. For example, two-dimensional passive visible systems may be used for identification at moderate range in controlled environments, but the accuracy of these systems is limited by the individual's pose and expression and the level of illumination. Visible or short-wave infrared (SWIR) imagers can be used for iris scanning and identification at ranges of up to about 100 meters (m). However, for diffraction-limited sub-millimeter resolution, as needed for iris scanning, at SWIR wavelengths requires a large (for some applications, 40 centimeter) aperture, and as a result, these devices are not readily portable. Three-dimensional visible sensors using a stereo camera, structured light or slow-scan LADAR (also referred to as LIDAR; light detection and ranging) are limited to short-range applications and are not practical in many environments. Commercial LADAR scanners may be used to scan buildings, rock formations and the like to produce a three-dimensional model of the object. The LADAR scanner may use rotating parts and/or mirrors to scan a laser beam over a wide range of angles. The laser beam scans and is used to measure the distance to the first object in its path. Single point scanned LADARs are typically slow.

SUMMARY OF INVENTION

Aspects and embodiments provide a method and apparatus for 3D imaging, and optionally face recognition or other identification, using 3D UV LADAR. As discussed below, the use of UV LADAR enables a small, covert identification system with improved accuracy and range compared to conventional SWIR systems.

According to one embodiment, a 3D ultraviolet (UV) imaging LADAR system comprises a UV source configured to generate a UV interrogation beam, a sensor configured to receive a UV return beam reflected from a target and to produce an electrical signal, and an imaging module coupled to the sensor and configured to receive the electrical signal and to generate a corresponding 3D image of the target.

In one example, the sensor includes a down-shifting device configured to receive the return beam of UV light reflected from the target and to down-shift the UV return beam to a down-shifted light beam of a different wavelength, and a detector coupled to the down-shifting device and configured to receive the downshifted light beam and to produce the electrical signal. The wavelength of the down-shifted light beam may be in the visible wavelength region or short-wave infrared (SWIR) region, for example. The down-shifting device may include a nanocrystal layer disposed over at least a portion of the detector, the nanocrystal layer including a plurality of nanocrystals configured to absorb UV photons from the UV return beam and to emit down-shifted photons. In one example, the nanocrystal layer includes a colloidal quantum dot layer. The plurality of nanocrystals may include a plurality of lead-sulfide quantum dots configured to emit SWIR photons having a wavelength of approximately 1400 nanometers. In one example, the detector includes a Mercury-Cadmium-Tellurium avalanche photodiode. In another example, the UV source includes at least one UV light emitting diode. In another example, the UV source includes a Gallium-Nitride-based laser diode array. The UV interrogation beam may have a wavelength in a rage of approximately 200 to 400 nanometers, for example.

In another example of the 3D UV imaging LADAR system, the imaging module includes an analog-to-digital converter configured to receive the electrical signal and to provide image data, and an image processor coupled to the analog-to-digital converter and configured to receive and process the image data to provide the 3D image of the target. The 3D UV imaging LADAR system may further comprise a database including a plurality of images, and the imaging module may be further configured to compare the 3D image of the target with at least some of the plurality of images in the database. In one example, the system is further configured to provide a detection indicator responsive to obtaining a match between the 3D image of the target and the images in the database. The system may further comprise a visible sensor configured to produce a visible image of a scene including the target. The system may further comprise an operator display interface coupled to the visible sensor and configured to display the visible image of the scene. In one example, the visible sensor is a camera. In another example, the system further comprises a biometric module coupled to the sensor and configured to receive the electrical signal and to provide UV biometric information based on the UV return beam.

According to another embodiment, a method of identification comprises generating an ultraviolet (UV) interrogation beam, receiving a UV return beam reflected from a target, down-shifting the UV return beam to a short-wave infrared (SWIR) signal, and producing a 3D UV image of the target from the SWIR signal.

According to another embodiment, a method of 3D imaging using an ultraviolet (UV) LADAR system comprises generating a UV interrogation beam, receiving a UV return beam reflected from a target, and processing the UV return beam to produce a corresponding 3D image of the target.

In one example, processing the UV return beam includes down-shifting the UV return beam to a short-wave infrared (SWIR) signal, and producing the 3D UV image of the target from the SWIR signal. Down-shifting the UV return beam may include absorbing UV photons from the UV return beam with a colloidal quantum layer, and emitting SWIR photons from the colloidal quantum dot layer corresponding to the SWIR signal. In another example, processing the UV return beam includes down-shifting the UV return beam to produce a down-shifted beam having a wavelength in the visible spectral region, and producing the 3D UV image of the target from the down-shifted beam. In another example, generating the UV interrogation beam includes generating the UV interrogation beam having a wavelength in a range of approximately 200 to 400 nanometers.

The method may further comprise scanning a scene containing the target with a visible sensor, detecting the target with the visible sensor, and responsive to detecting the target, directing the UV interrogation beam toward the target. In one example, the method further comprises comparing the 3D UV image of the target against a database of images. In another example, the method further comprises generating a detection indicator responsive to detecting a match between the 3D UV image of the target and at least one image in the database of images.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

There is a need for a robust facial recognition system that can allow covert identification of individuals at long range (for example, >50 m) in uncontrolled situations and despite various adverse conditions, such as low light, poor quality images, low resolution, tilt or angle of the sensor relative to the individual, and where only a portion of the individual's face may be visible. In addition, for various applications it may be desirable that the system is portable, can operate with limited memory storage, and may incorporate existing sensors and cooperate with existing image databases.

Accordingly, aspects and embodiments are directed to a system and method for three dimensional (3D) object identification, for example, facial recognition, that overcomes the long range diffraction limit in visible-SWIR LADAR systems by using near-ultraviolet (near-UV) lasers and detectors, as discussed below. In one embodiment, a miniature, for example, handheld or compatible with unmanned aerial vehicles, near-UV LADAR system is provided that is configured to capture facial images at ranges of about 30 to 50 meters (m), thus enabling covert, long-range identification.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
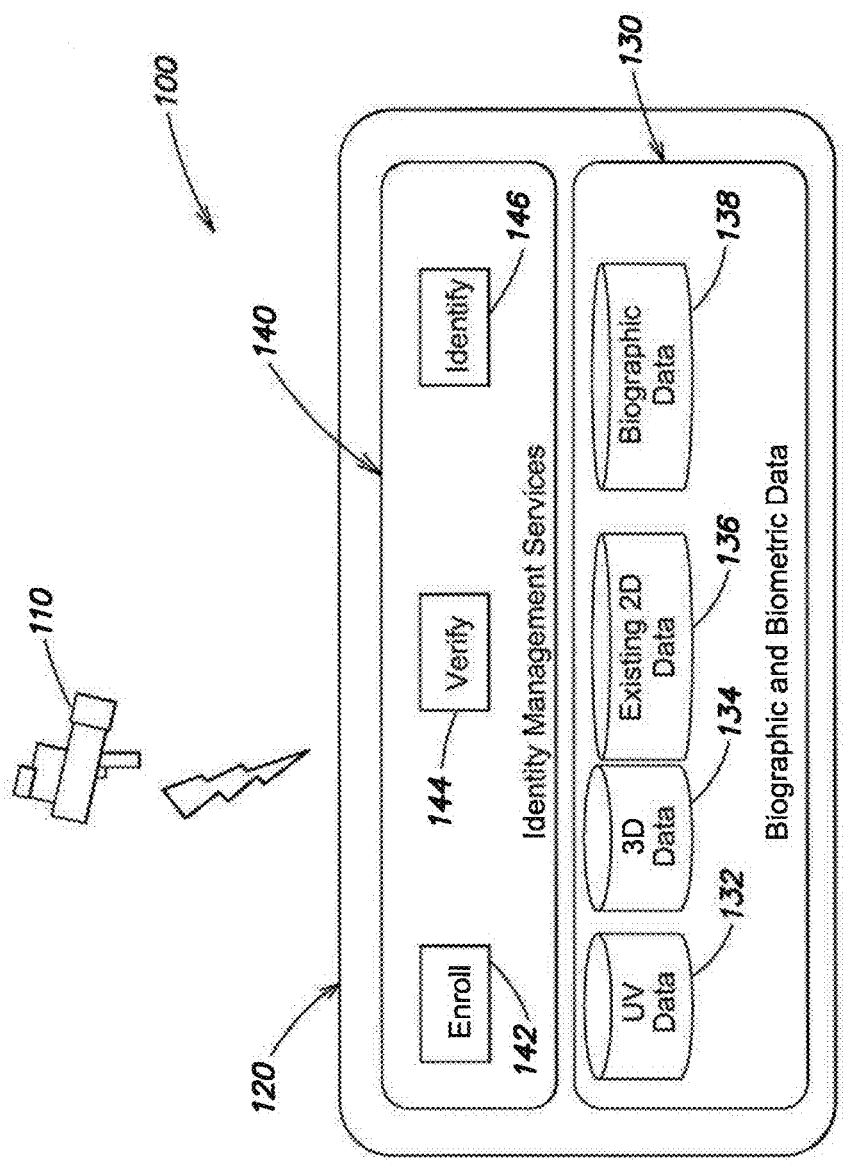
FIG. 1 is a block diagram of one example of a facial recognition system according to aspects of the invention.

Referring to FIG. 1, there is illustrated a block diagram of one example of a facial recognition system according to one embodiment. The system 100 includes a sensor module 110 coupled to an identification module 120. In one embodiment, the sensor module 110 includes a UV biometric sensor configured to transmit a UV interrogation beam and to generate 3D images from received UV light reflected from the target. The identification module 120 may be implemented on a computer system or processor, and may include modules or programs configured to implement numerous processing and identification functions, as discussed further below. In one example, the identification module 120 includes a database 130 that stores biographic and biometric data used for identification of a target based on the images captured by the sensor module 110, as discussed further below. Embodiments of the system 100 may be used to perform a variety of identity management services 140, including, for example, to enroll subjects into a database (142) and to verify (144) and/or identify (146) subjects already within the database.

Figure 2:
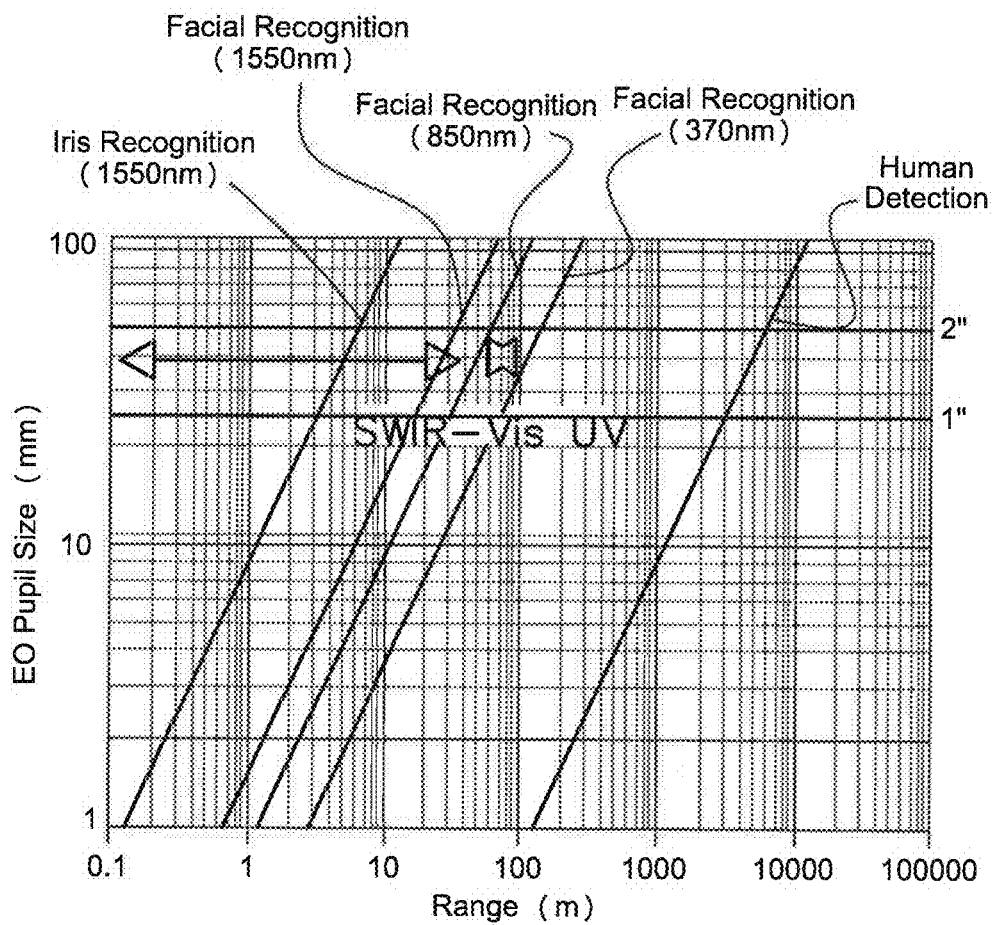
FIG. 2 is a graph illustrating electro-optic pupil size of a LADAR system as a function of range to the target for different laser wavelengths.

Three dimensional images of faces with volumetric resolution (voxels) of about 1 $mm^3$ have been shown to be superior to two dimensional images for high confidence identification with low false alarm rates. Conventional LADAR uses pulsed lasers in the SWIR (short wave infrared) band to obtain three dimensional images, but as discussed above, requires large apertures, for example, 8 inches or larger, to obtain millimeter spatial resolution at ranges beyond about 30 m. Referring to FIG. 2, there is illustrated a graph of electro-optic pupil size of a LADAR system as a function of range to the target for different laser wavelengths. As can be seen with reference to FIG. 2, the aperture size scales with range in a similar manner for different wavelengths; however, the shorter the wavelength, the smaller the aperture needed to achieve a certain resolution at a given range. Thus, the use of near-UV light having wavelengths of about 300-400 nanometers (about 4-5 times smaller wavelength than SWIR) allows for a dramatic reduction in the size of the system. For example, a UV LADAR-based facial recognition system may be implemented with an aperture diameter of less than 1 cm to achieve 1 mm resolution at a range of greater than about 60 m. By contrast, as discussed above, a conventional SWIR optical system for iris recognition having approximately 1 mm resolution at a range above 50 m has an aperture diameter of about 40 cm. Thus, using UV light instead of SWIR light allows implementation of a small, covert face recognition, or other identification, system.

Figure 3:
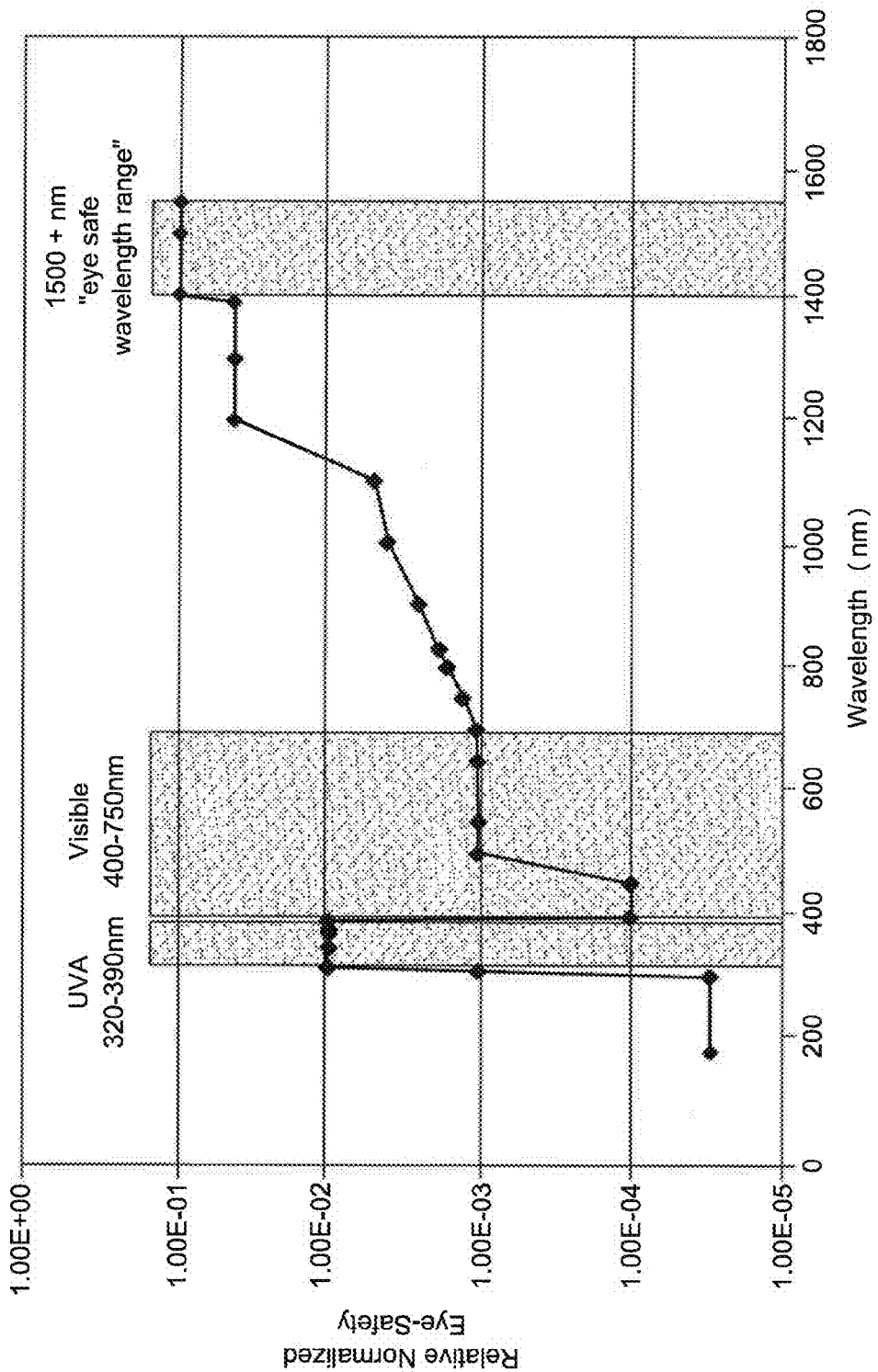
FIG. 3 is a graph illustrating relative eye safety as a function of wavelength.
Figure 4:
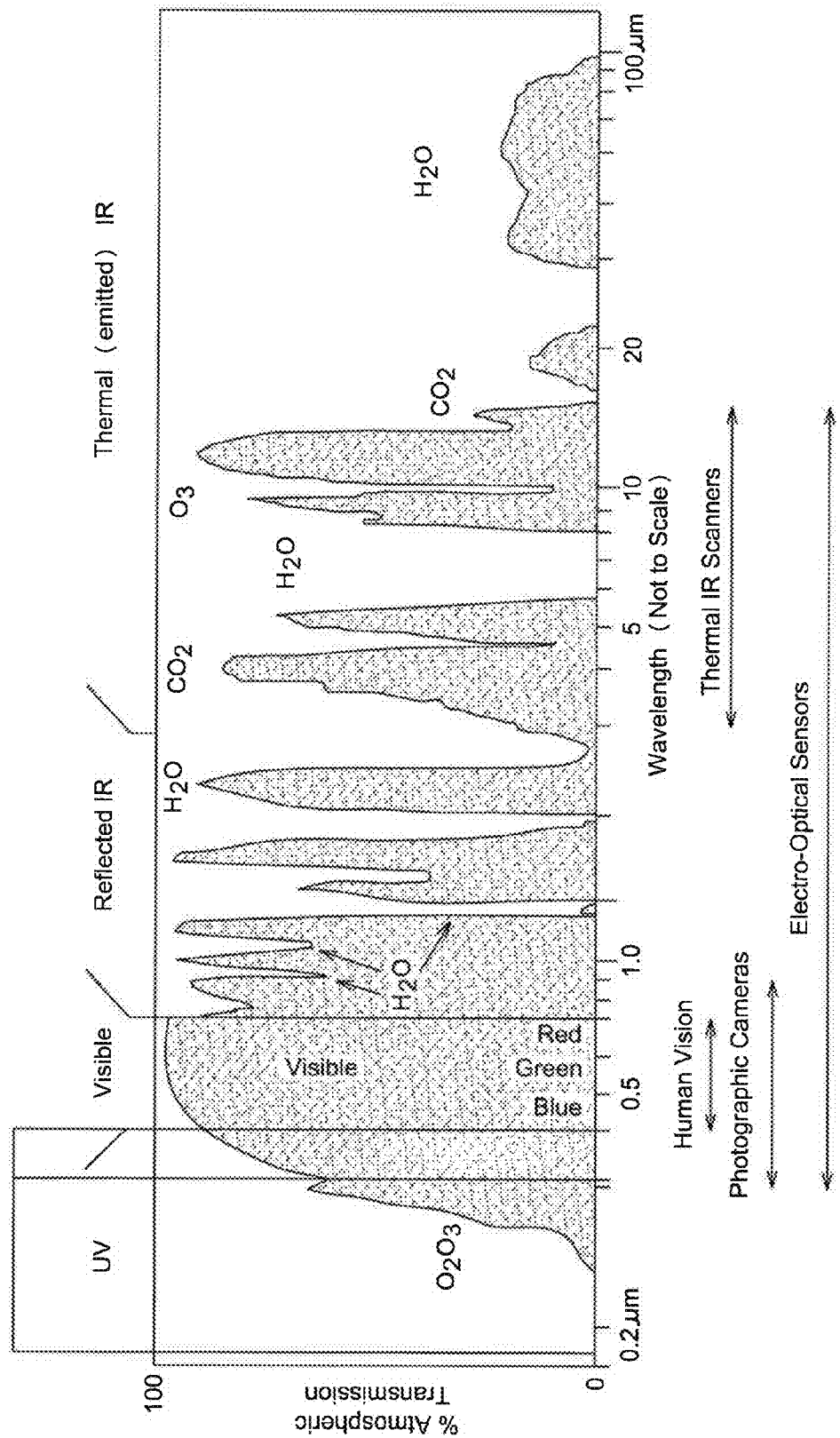
FIG. 4 is a graph illustrating atmospheric transmission as a function of wavelength.

In addition, using near-UV laser light has the advantage that near-UV is "eye-safe," even for relatively high-intensity laser beams. Thus, although smaller systems than SWIR systems may be implemented using visible light, such systems have the disadvantage of the interrogation beam being both visible (making the system less covert) and potentially hazardous if a high intensity laser beam is used. By contrast, UV light, having wavelengths in the range of approximately 200 to 400 nanometers (nm) is invisible to humans, ordinary cameras, satellite imaging technologies, video equipment and unmodified night vision equipment. Referring to FIG. 3, there is illustrated a graph of normalized relative eye safety as a function of wavelength. FIG. 3 illustrates that UVa light (UV light having a wavelength in the range of approximately 315 to 400 nm) is about an order of magnitude safer for human eyes than visible light. Furthermore, UV light may be generated using a light emitting diode or other laser source that has no radio frequency (RF) signature or traceable electromagnetic interference (EMI). Additionally, UV light has good transmittance through the atmosphere. For example, referring to FIG. 4, UVc (UV light having a wavelength in the range of approximately 200-280 nm) visibility can extend several miles. As a result, the range of a UV LADAR system may be limited by desired image quality and resolution, rather than atmospheric conditions. Thus, using UV light, a LADAR biometric system may be implemented that is small relative to conventional SWIR systems, covert and eye-safe.

In one example (see FIG. 1), the sensor module 110 includes a UV detector that is capable of detecting returned UV light from the target and generating an image of the target from the detected UV light, as discussed further below. According to another embodiment (see FIG. 5), a conversion or down-shifting mechanism is used to convert or "shift" received UV light at the UV LADAR sensor to SWIR light that can be detected using SWIR detectors. An advantage of using this conversion mechanism is that a LADAR system may be implemented which has the advantages of UV (such as small aperture size, and covertness, as discussed above) and uses existing SWIR detectors, making the system compatible with existing technology and relatively low-cost. Another advantage is that the system may "extend" the same SWIR imager to a dual-use imager, capable of detecting both SWIR and UV light, by providing the ability to switch between SWIR imaging and UV LADAR modes, or between SWIR LADAR and UV LADAR modes. For example, the system may include switchable optics to allow transition between these different modes. In one embodiment, the down-shifting mechanism includes a colloidal quantum dot over-layer that is used to down-shift the received UV light to the SWIR band, as discussed further below. The SWIR radiation may then be detected using a large format LADAR receiver.

Figure 5:
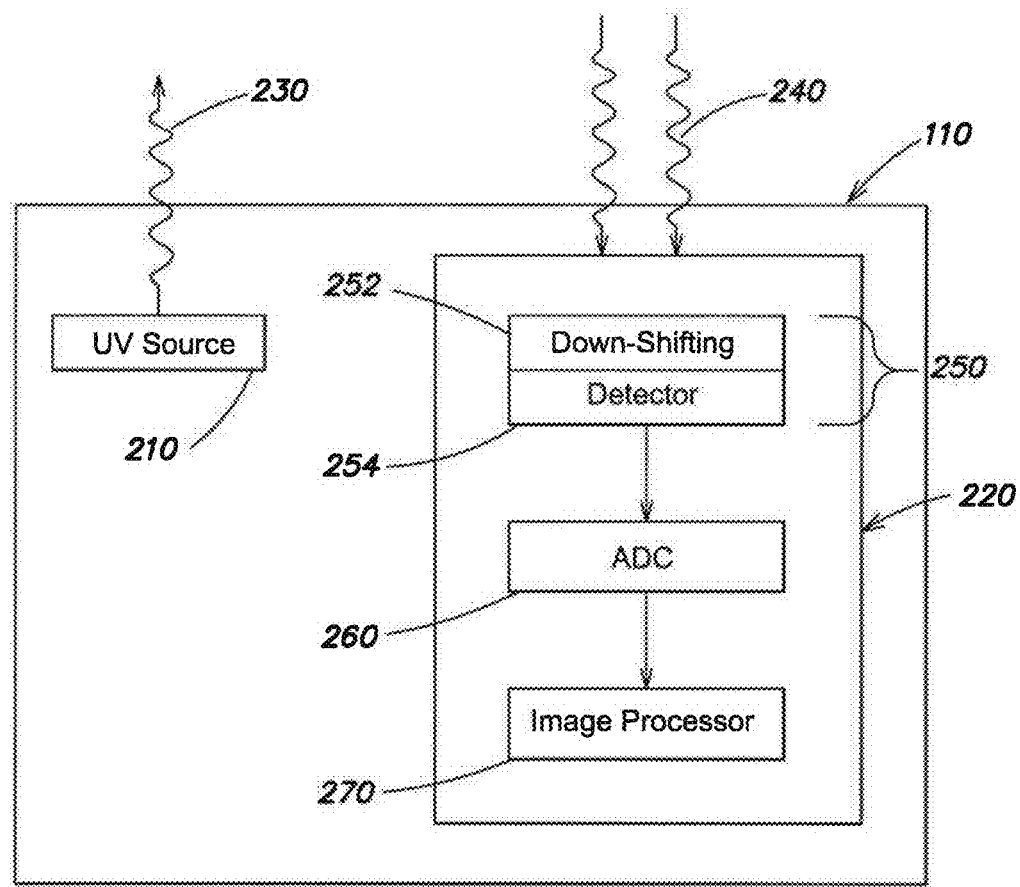
FIG. 5 is a block diagram of one example of a sensor module according to aspects of the invention.

Referring to FIG. 5 there is illustrated a block diagram of one example of a UV sensor module 110 according to one embodiment. The sensor module 110 includes a UV source 210 and a UV LADAR receiver 220. Although the UV source 210 and receiver 220 are illustrated separately, they may be integrated in a single or multiple components. The UV source 210 produces an interrogation beam 230 used to obtain an image of a target. In one example, the UV source includes UV light emitting diodes (LEDs). In another example, the UV source 210 is a laser diode array, for example, a Gallium-Nitride (GaN) based laser diode array. The interrogation beam 230 is a UV beam having a wavelength in the range of about 200-400 nm, for example, approximately 285 nm. The UV LEDs may be pulsed up to the limits of their speed to produce a pulsed interrogation beam 230. The interrogation beam 230 is reflected by the target and returns as return beam 240 to the sensor module 110. The return beam 240 is received by a detector module 250 in the UV LADAR receiver 220. In one example, the UV LADAR receiver 220 is a 256×256 ($256^2$) LADAR flash receiver that captures pulse intensity and target range information from the return beam 240, and produces 3D images of the target, as discussed further below.

In one embodiment, the detector module 250 includes a down-shifting layer 252, coupled to a detector layer 254. The down-shifting layer may be a nanocrystal layer that includes nanocrystals operable to absorb first photons (from the return beam 240) of a higher energy and emit second photons of a lower energy in response to the absorption. The detector layer 254 is configured to detect the second photons and may generate image data that can be used to generate an image of the target. Thus, the UV LADAR receiver 220 may be configured to detect the lower energy photons and generate an image from the higher energy photons. In one example, the higher energy photons are UV photons, and the lower energy photons may be visible or infrared photons. In this manner, the UV light is used to capture and generate the image of the target, yet the detector layer 254 may include visible or infrared detectors.

As used herein, the term "nanocrystal" refers to a semiconductor nano-material object that is confined in one, two or three spatial dimensions to invoke quantum confinement effects that are not seen in bulk semiconductor materials. The nanocrystals may have any suitable size provided that quantum confinement effects are established, for example, a diameter in a range of about 2-10 nm. A larger nanocrystal may yield a lower energy down-shifted photon, and a smaller nanocrystal of the same semiconductor material may yield a higher energy down-shifted photon. For example, larger nanocrystals may be used to achieve down-shifting from UV light to infrared light (e.g., in the SWIR band), whereas smaller nanocrystals may be used to achieve down-shifting from UV light to visible light. Examples of nanocrystals include quantum dots, core/shell quantum dots, nanorods, tetrapods, and nanobarbells. Examples of detectors including a nanocrystal layer for photon down-shifting are described in U.S. application Ser. No. 12/952,330 filed on Nov. 23, 2010 and entitled "DOWN-CONVERTING AND DETECTING PHOTONS," which is herein incorporated by reference in its entirety.

In one example, the down-shifting layer 252 includes a colloidal quantum dot layer that includes quantum dots embedded in a transparent (at the wavelength ranges of interest) medium, for example, a polymer matrix. In one example, the quantum dots are dispersed in polymethylmethacrylate (PMMA), and may be deposited on a substrate, for example by drop cast or spin coating, to form the down-shifting layer 252. In another example, the quantum dots may be dispersed in a silicone adhesive or polyimide layer. As discussed above, the quantum dots absorb the UV light from the UV return beam 240 and re-emit in the SWIR or visible bands. The emitted light is then detected by the detector 254. In one example, the quantum dots are lead-sulfide (PbS) quantum dots emitting wavelengths around 1400 nm (in the SWIR band). In one example, the detector layer 254 includes an SWIR detector, such as an SWIR avalanche photodiode (APD); for example, a high sensitivity HgCdTe (Mercury-Cadmium-Tellurium) APD. The colloidal quantum dot layer may be applied as a coating on the SWIR APD. In one example, the receiver 220 integrates high sensitivity HgCdTe APDs with a low noise integrated circuit (for image processing, as discussed below) based on 0.18 micron lithography. In this example, the down-shifting layer 252 is implemented as a quartz slide with a colloidal quantum dot layer including PbS quantum dots embedded in a polymer and optimized for UV having a wavelength of approximately 300 nm. HgCdTe APD technology has been shown to be capable of linear mode detection of single photons. Single photon sensitivity allows the use of high efficiency low power UV laser sources, such as GaN-based laser diode arrays, for example. The down-shifting or re-emission process performed by the quantum dots is fast, for example, on the order of a few nanoseconds, which is compatible with short pulse LADAR systems. In addition, the quantum dots exhibit a relatively high conversion (or re-emission) efficiency. For example, the conversion efficiency from UV to SWIR using PbS quantum dots may be approximately 50%. In another example, the quantum dots may achieve a down-shifting efficiency of approximately 95% for shifting UV light to visible light. Thus, using a colloidal quantum dot layer may provide a fast, efficient mechanism for down-shifting the UV light, enabling low cost conversion of SWIR LADAR sensors to UV-capable sensors. In other examples, the down-shifting layer 252 includes other nano-engineered down-shifting devices, such as, for example, light-sensitive dyes, lead-selenium (PbSe) quantum dots, indium-arsenide (InAs) quantum dots, J-aggregates, etc.

Still referring to FIG. 5, the detector module 250 may be configured to generate an electrical signal in response to detection of the return beam 240. For example, as discussed above, the detector layer 254 may include a photodetector, such as an APD, that is configured to generate an electrical signal in response to detection of the re-emitted photons from the down-shifting layer 252. In the illustrated example, this electrical signal is provided to an analog-to-digital converter 260 which converts the signal to digital data that is supplied to an image processor 270. The image processor 270 uses the digital data to generate image data than can be used to construct an image of the target. In one example, the analog-to-digital converter 260 and image processor 270 may be implemented as an integrated circuit (as discussed above), and may be integral with the detector module 250.

As discussed above, according to one embodiment, the sensor module 110 is configured to generate 3D image data collected via the UV return beams 240. Referring again to FIG. 1, in one example, 3D images may be constructed from the image data, either by the sensor module 110 or by the identification module 120. It is further to be appreciated that although the sensor module 110 and identification module 120 are illustrated separately, various functions and/or components of the two modules may be combined or integrated together. Thus, FIG. 1 is intended to represent a functional block diagram rather than a physical implementation. According to one embodiment, UV data 132 captured by the sensor module 110 may be converted to 3D image data 134, which may then be compared against databases of 2D image data 136 and/or 3D images, as well as biographic data 138 to attempt to match an generated image of the target, for example, a person's face, with known images (e.g., faces of persons of interest).

Figure 6:
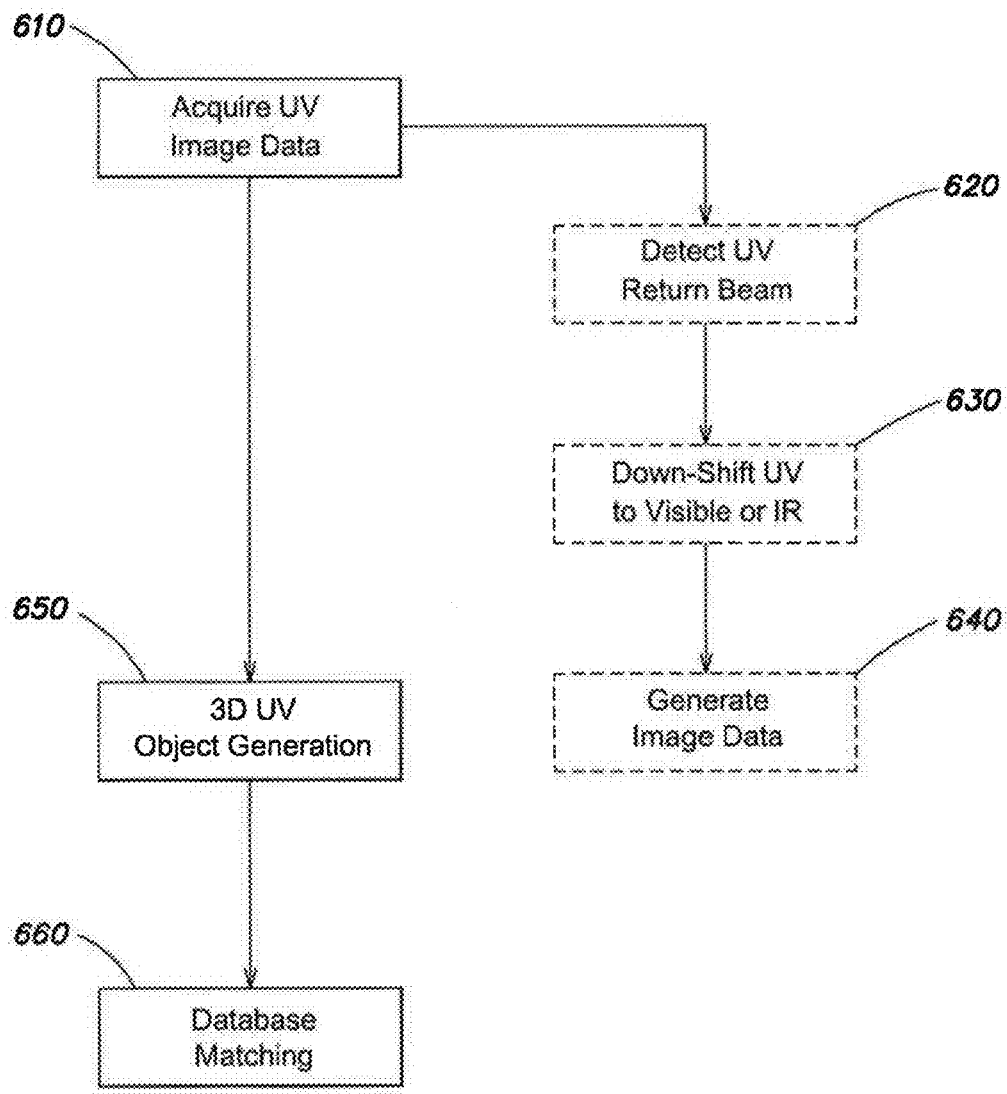
FIG. 6 is a flow diagram illustrating one example of a method of identification according to aspects of the invention.

Referring to FIG. 6, in one embodiment a method of identification includes acquiring UV image data (step 610). As discussed above, in one example, step 610 optionally includes detecting the UV return beam 240 (step 620), down-shifting the UV to visible or infrared light (step 630), for example, using a colloidal quantum dot layer, and generating image data from the down-converted photons (step 640). Once the UV image data has been acquired, step 650 includes generating a 3D UV image of the target object, for example, a face. The image may then be compared against one or more databases (step 660) to attempt to identify the image and/or to provide confidence that the image is or is not of a person (or other object) of interest.

Figure 7:
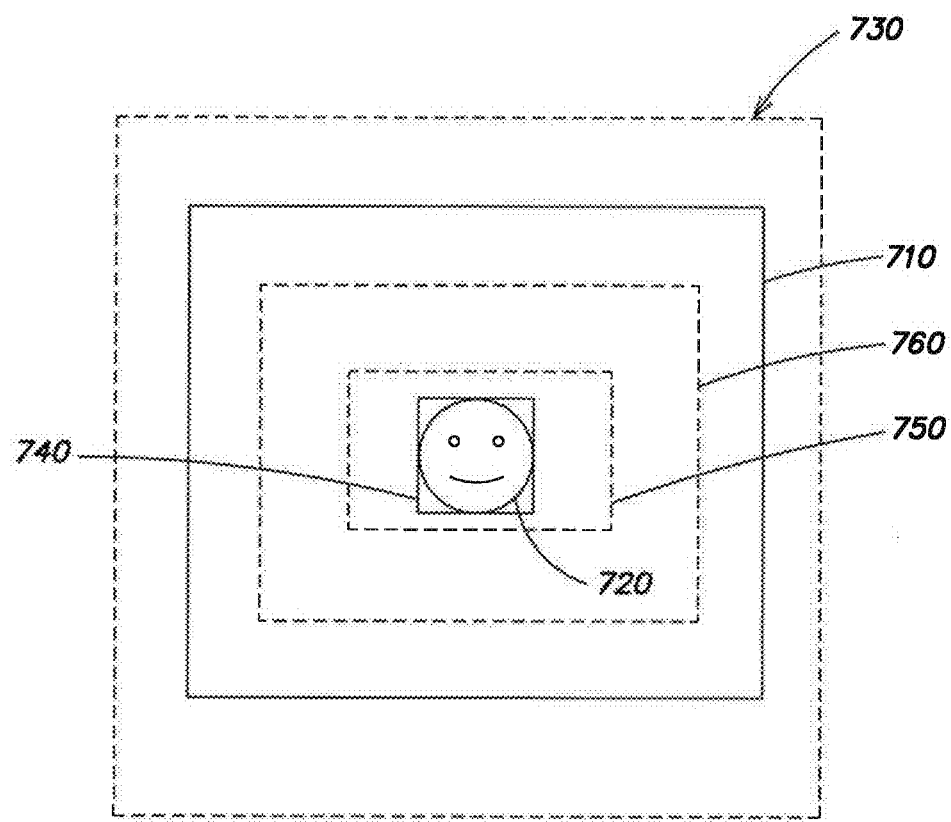
FIG. 7 is a schematic diagram illustrating different fields of view according to aspects of the invention.

As discussed above, according to one embodiment, a 3D UV LADAR system is used to capture 3D target object information. To achieve adequate resolution for certain applications, such as facial recognition or iris identification for example, the field of view of the UV sensor may be relatively small. As a result, the UV sensor may need to be relatively accurately pointed toward the target object. Accordingly, in one embodiment, a visible imaging system, such as a visible camera, is used to provide cueing for the 3D UV LADAR system. The visible imaging system may have lower resolution, and therefore a significantly wider field of view, since the system may be used to identify potential targets of interest within a scene for more detailed imaging by the UV LADAR system. For example, referring to FIG. 7, a scene 710 may include a target object of interest (such as a person's face) 720. A visible imaging system may have a large field of view 730 that encompasses the scene 710 and can be used to direct the field of view of the 3D UV LADAR system toward the object of interest 720. As discussed above, in one example, the LADAR receiver 220 includes a $256^2$ pixel detector, which may have a field of view 740 that encompasses (or nearly encompasses) the target object, as shown in FIG. 7. In other examples, larger receivers having correspondingly larger fields of view may be used to achieve detailed imaging of a larger target object or multiple objects (at the same range). For example, a $512^2$ pixel receiver may have a field of view 750, and a $1024^2$ pixel receiver may have a field of view 760.

Figure 8:
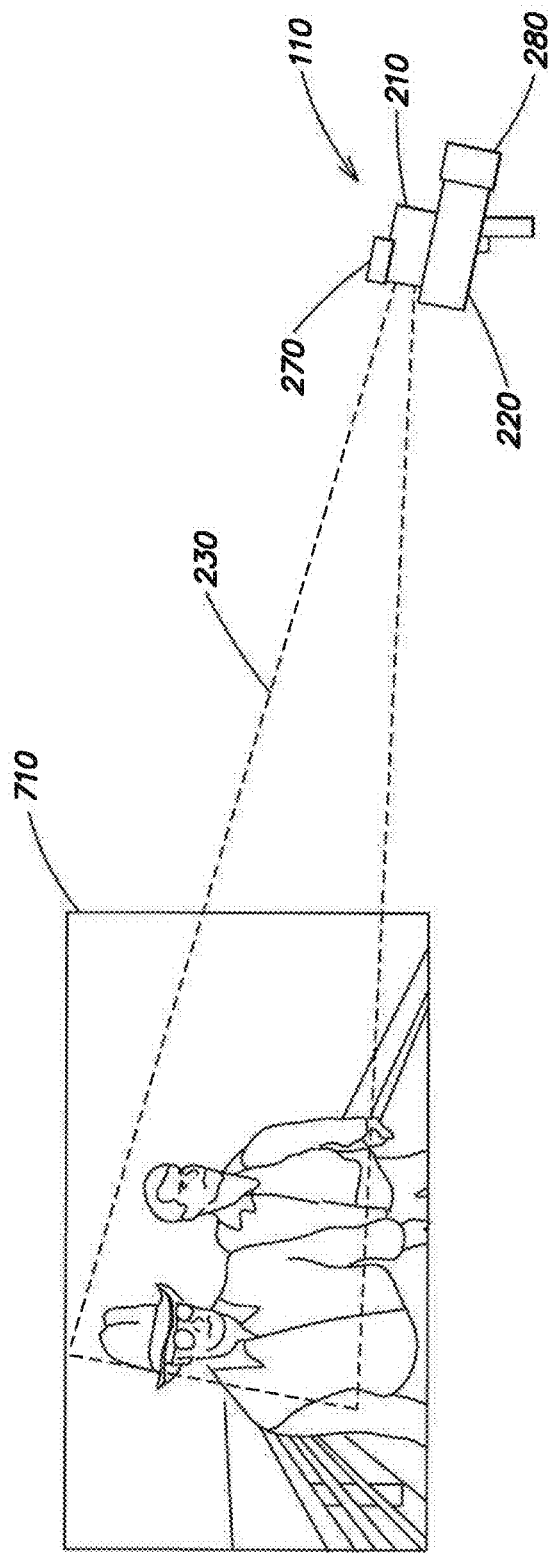
FIG. 8 is a diagram of one example of a UV LADAR system illuminating a scene according to aspects of the invention.

Accordingly, referring FIG. 8, the sensor module 110 may further include a visible camera 275 in addition to the UV laser source 210 and UV LADAR receiver 220. Thus, as illustrated in FIG. 7, the sensor module 110 may have dual fields of view including the lower resolution, larger visible field of view 730 and a smaller, higher resolution UV field of view 740, 750 or 760. The sensor module 110 may further include an operator display interface 280 coupled to the visible camera 275. This display interface 280 may allow an operator to view the scene 710 based on visible image data obtained using the visible camera 275 and aim the interrogation beam 230 within the scene to illuminate potential target objects of interest. As discussed above, using a UV interrogation beam and sensor for object identification allows the receiver 220 to have a dramatically smaller aperture compared to an IR sensor with the same resolution and/or range due to the fact that the wavelength of UV light is approximately 5 times smaller than that of infrared light. This reduction in aperture size may enable approximately an 8-27 times volumetric reduction in the size of the sensor module 110. With the use of light-weight packaging/housing materials, the sensor module 110 (or even the system 100) may be made portable or handheld.

Figure 9:
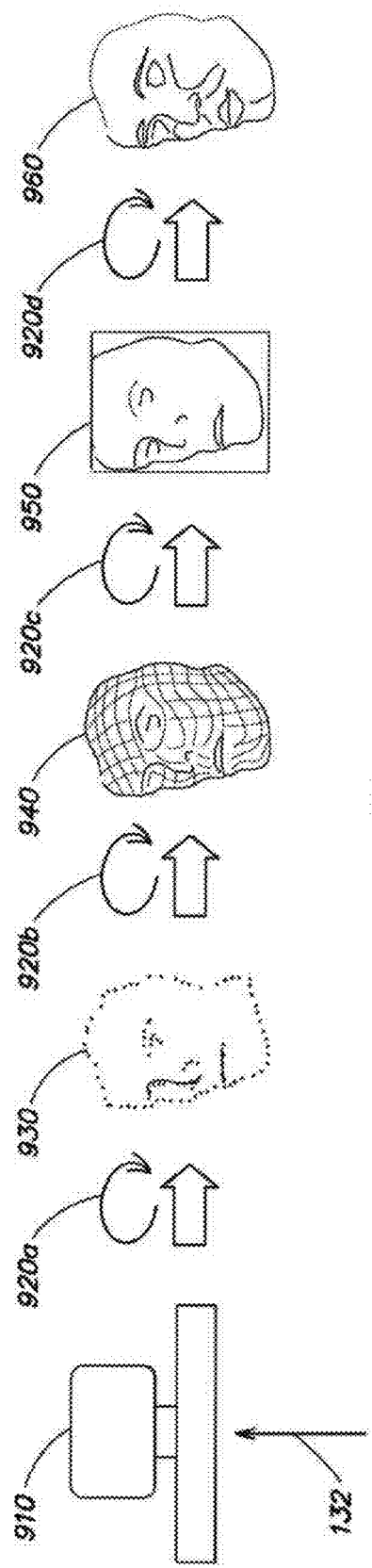
FIG. 9 is a flow diagram illustrating one example of generating a 3D image of a face according to aspects of the invention.

As discussed above, after the UV data is acquired, images of the target object may be generated from the UV data and compared to images in existing databases. In one example, the UV data is used to generate two-dimensional (2D) images of the target object which can be compared to 2D UV image databases 136. According to one embodiment, the UV data can be used to generate 3D images, as discussed above. Referring to FIG. 9 there is illustrated one example of a method of generating a 3D image of a face. In one example, this process may be included in or correspond to step 650 of generating a 3D UV object. In the example illustrated in FIG. 9, the UV data 132 is provided to a processor 910, for example, the image processor 270 or a computer system, which performs a series of process loops 920a-920d to generate an image 960 from the UV data stream 132. In a first process loop 920a, the processor 910 may assemble a cloud of data points 930. In a second process loop 920b, the processor 910 may process the cloud of data points to produce a mesh 940. In a third process loop 920c, the processor 910 may process the mesh to produce a first surface 950 corresponding to the face. Lastly, the processor 910 may further process the data to add surface features and texture to the first surface to produce the image 960 of the face. The generated image 960 of the face may then be compared to 3D face databases (in step 660). In one example, the image database matching may include partial 3D matching.

According to another embodiment in which the sensor module 110 includes a visual imaging system, for example, the visible camera 275, visible image data may be used to generate a visible image of the target object, such as a face, such can be compared to visible face image databases. In addition, even low resolution visible data may be used to provide some information about the target object, for example, skin color, that can be used to enhance the 3D data and/or to narrow down the image databases for comparing with the UV-generated image 960.

Figure 10:
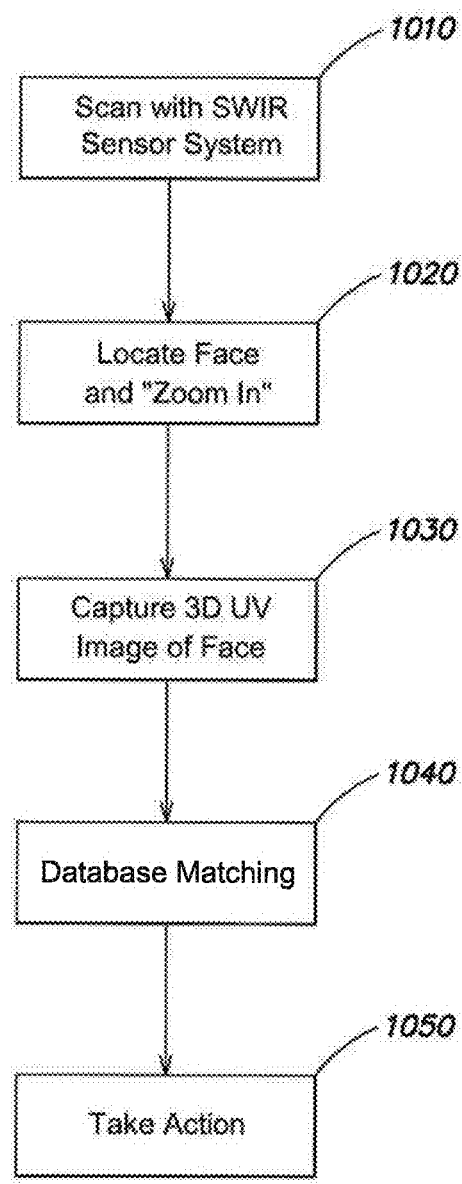
FIG. 10 is a flow diagram of one example of a surveillance method according to aspects of the invention.

Referring to FIG. 10 there is illustrated a flow diagram of one example of a method of covert surveillance using a multi-spectral sensor system according to one embodiment. The sensor system may scan an area, such as a crowd at a special event, or an access point to a protected area or facility, etc., using an SWIR scanning beam and detector to locate faces (step 1010). It is to be appreciated that in other applications, initial scanning or monitoring may be performed using a visible light system, as discussed above. In addition, in other applications, the system may be configured to locate particular objects or features other than faces. Once a face (or other feature of interest is located), the system may be configured to direct the UV sensor system toward the face, to "zoom in" on the face (step 1020). The system may capture a 3D UV image of the face, as discussed above (step 1030). This system may then perform database matching (step 1040), to match the image of the face against known faces of interest, or a "watch list," for example. If a match is detected, the system may alert an operator to the possible presence of the person of interest or a potential threat (step 1050).

Thus, aspects and embodiments provide a method and apparatus for 3D imaging, and optionally face recognition or other identification, using UV LADAR. 3D imagery allows for high confidence identification. UV reveals enhanced structure and/or texture in objects, such as faces, and provides significantly more contrast than SWIR. In addition, UV imaging may be used in combination with SWIR imaging to provide orthogonal information, or information from different modalities, about the same target object, thereby increasing identification accuracy. For example, using UV, alone or in combination with SWIR, may allow discrimination between similar faces, for example, between twins, and may detect attempts to disguise a face through plastic surgery. For example, SWIR imaging can detect veins and arteries beneath a person's skin to provide a "vein pattern" which is rarely altered by plastic surgery. This vein pattern may be used in combination with 3D UV imaging to allow a person to be identified with high certainty or accuracy. Thus, 3D UV imaging may provide increased accuracy for identification.

Figure 11:
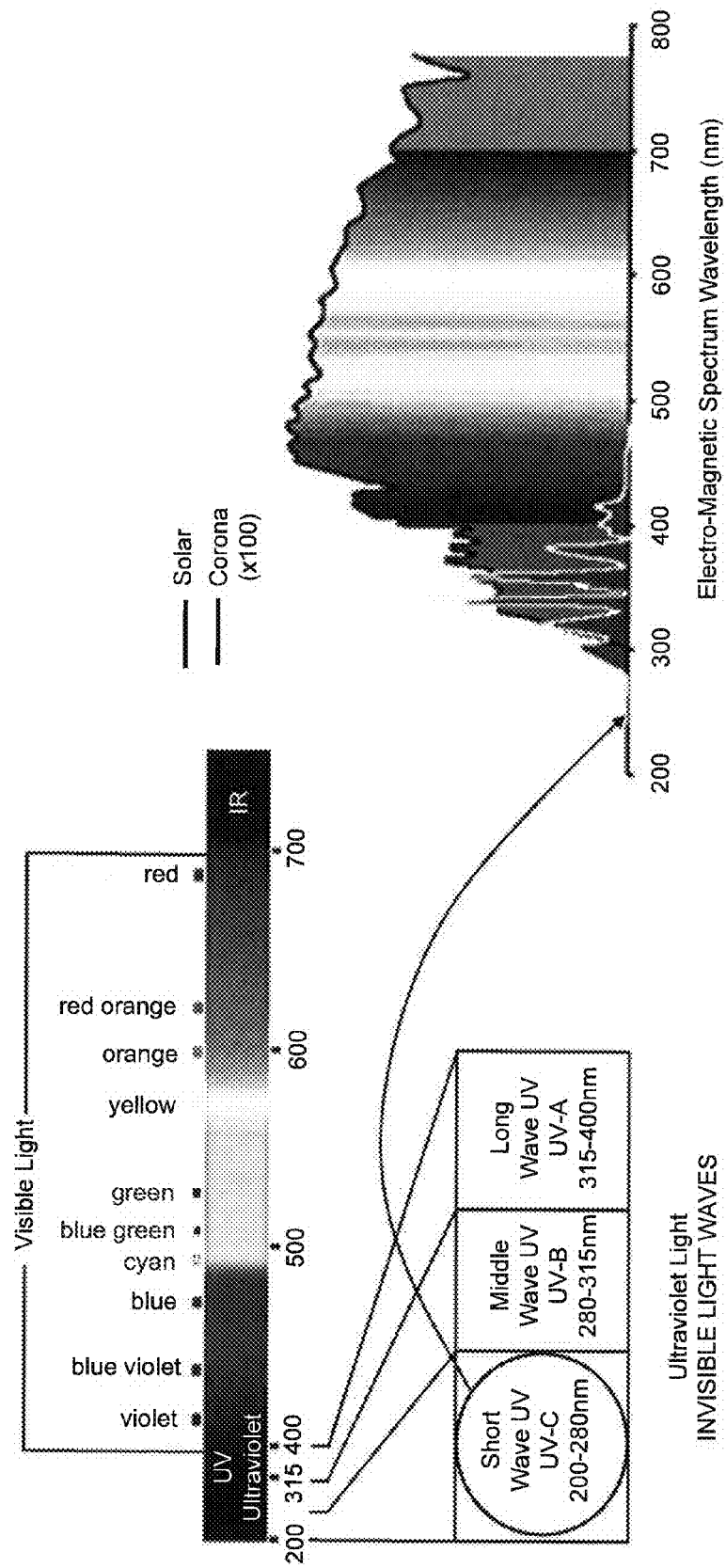
FIG. 11 is a diagram illustrating spectral irradiance of the sun's corona and solar energy as a function of electro-magnetic spectrum wavelength.

UV also offers significantly better camouflage penetration than visible light. Furthermore, UV occurs in the "solar blind" region (see FIG. 11) where there is substantially diminished solar radiation as it is almost completely blocked by the earth's ozone layer, and therefore using UV instead of visible light reduces or eliminates solar interference and clutter and eliminates the sun's saturation effect on visible sensors. These features may allow a UV imaging system to identify people or objects in operational environments where the target may be moving, the illumination of the scene is uncontrolled and the target may be in shadow, and portions of the target may be obscured (e.g., the person may be wearing a hat or glasses). In addition, as discussed above, UV provides approximately a 5× reduction in aperture/sensor size for a given range compared to conventional SWIR sensors, and is approximately 10× more eye-safe than visible light. Furthermore, the use of a colloidal quantum dot or other nano- or chemical-engineered overcoating allows compatibility with existing sensors and receivers.

Various embodiments of the 3D UV imaging systems and methods discussed above may be used in a wide variety of applications, including, for example, long-range (e.g., greater than 50 m) identification, unique vehicle identification, area monitoring (e.g., monitoring border checkpoints, high value facilities, or other assets), and special event protection.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A 3D ultraviolet (UV) imaging LADAR system comprising:
   a UV source configured to generate a UV interrogation beam;
   a sensor configured to receive a UV return beam reflected from a target and to produce an electrical signal, wherein the sensor includes:
      a down-shifting device configured to receive the return beam of UV light reflected from the target and to down-shift the UV return beam to a down-shifted light beam of a different wavelength, wherein the down-shifting device includes a nanocrystal layer including a colloidal quantum dot layer disposed over at least a portion of the device, the nanocrystal layer including a plurality of nanocrystals configured to absorb UV photons from the UV return beam and to emit down-shifted photons; and
      a detector including a Mercury-Cadmium-Tellurium avalanche photodiode coupled to the down-shifting device and configured to receive the downshifted light beam and to produce the electrical signal; and
   an imaging module coupled to the sensor and configured to receive the electrical signal and to process the electrical signal to generate a corresponding 3D image of the target.

2. The 3D UV imaging LADAR system of claim 1, wherein the wavelength of the downshifted light beam is in the visible wavelength region.

3. The 3D UV imaging LADAR system of claim 1, wherein the wavelength of the downshifted light beam is in the short-wave infrared (SWIR) region.

4. The 3D UV imaging LADAR system of claim 1, wherein plurality of nanocrystals includes a plurality of lead-sulfide quantum dots configured to emit SWIR photons having a wavelength of approximately 1400 nanometers.

5. The 3D UV imaging LADAR system of claim 1, wherein the UV source includes at least one UV light emitting diode.

6. The 3D UV imaging LADAR system of claim 1, wherein the UV source includes a Gallium-Nitride-based laser diode array.

7. The 3D UV imaging LADAR system of claim 6, wherein the UV interrogation beam has a wavelength in a range of approximately 200 to 400 nanometers.

8. The 3D UV imaging LADAR system of claim 1, wherein the imaging module includes:
   an analog-to-digital converter configured to receive the electrical signal and to provide image data; and
   an image processor coupled to the analog-to-digital converter and configured to receive and process the image data to provide the 3D image of the target.

9. The 3D UV imaging LADAR system of claim 1, further comprising a database including a plurality of images, and wherein the imaging module is further configured to compare the 3D image of the target with at least some of the plurality of images in the database.

10. The 3D UV imaging LADAR system of claim 9, wherein the system is further configured to provide a detection indicator responsive to obtaining a match between the 3D image of the target and the images in the database.

11. The 3D UV imaging LADAR system of claim 1, further comprising a visible sensor configured to produce a visible image of a scene including the target.

12. The 3D UV imaging LADAR system of claim 11, further comprising an operator display interface coupled to the visible sensor and configured to display the visible image of the scene.

13. The 3D UV imaging LADAR system of claim 12, wherein the visible sensor is a camera.

14. The 3D UV imaging LADAR system of claim 1, further comprising a biometric module coupled to the sensor and configured to receive the electrical signal and to provide UV biometric information based on the UV return beam.

15. A method of 3D imaging using an ultraviolet (UV) LADAR system, the method comprising:
   generating a UV interrogation beam;
   receiving a UV return beam reflected from a target at a sensor including a down-shifting device and a detector; and
   processing the UV return beam to produce a corresponding 3D image of the target,. wherein processing includes:
      down-shifting the UV return beam to a down-shifted light beam of a different wavelength using the down-shifting device which includes a nanocrystal layer including a colloidal quantum dot layer disposed over at least a portion of the device, the nanocrystal layer including a plurality of nanocrystals configured to absorb UV photons from the UV return beam and to emit down-shifted photons;
      receiving the downshifted light beam and producing the electrical signal at the detector, the detector including a Mercury-Cadmium-Tellurium avalanche photodiode coupled to the down-shifting device; and
      receiving the electrical signal at an imaging module coupled to the sensor.

16. The method of claim 15, wherein processing the UV return beam includes:
   down-shifting the UV return beam to a short-wave infrared (SWIR) signal; and
   producing the 3D UV image of the target from the SWIR signal.

17. The method of claim 16, wherein down-shifting the UV return beam includes emitting SWIR photons from the colloidal quantum dot layer corresponding to the SWIR signal.

18. The method of claim 15, wherein processing the UV return beam includes:
   down-shifting the UV return beam to produce a down-shifted beam having a wavelength in the visible spectral region; and
   producing the 3D UV image of the target from the down-shifted beam.

19. The method of claim 15, wherein generating the UV interrogation beam includes generating the UV interrogation beam having a wavelength in a range of approximately 200 to 400 nanometers.

20. The method of claim 15, further comprising:
   scanning a scene containing the target with a visible sensor;
   detecting the target with the visible sensor; and
   responsive to detecting the target, directing the UV interrogation beam toward the target.

21. The method of claim 15, further comprising comparing the 3D image of the target against a database of images.

22. The method of claim 21, further comprising generating a detection indicator responsive to detecting a match between the 3D image of the target and at least one image in the database of images.

23. A 3D ultraviolet (UV) imaging LADAR system comprising:
   a UV source configured to generate a UV interrogation beam;
   a sensor configured to receive a UV return beam reflected from a target and to produce an electrical signal, wherein the sensor includes:
      a down-shifting device configured to receive the return beam of UV light reflected from the target and to down-shift the UV return beam to a down-shifted light beam of a different wavelength, wherein the down-shifting device includes a nanocrystal layer including a colloidal quantum dot layer disposed over at least a portion of the device, the nanocrystal layer including a plurality of nanocrystals configured to absorb UV photons from the UV return beam and to emit down-shifted photons, wherein the plurality of nanocrystals includes a plurality of lead-sulfide quantum dots configured to emit SWIR photons having a wavelength of approximately 1400 nanometers; and
      a detector coupled to the down-shifting device and configured to receive the downshifted light beam and to produce the electrical signal; and
   an imaging module coupled to the sensor and configured to receive the electrical signal and to process the electrical signal to generate a corresponding 3D image of the target.

24. The 3D UV imaging LADAR system of claim 23, wherein the wavelength of the downshifted light beam is in the visible wavelength region.

25. The 3D UV imaging LADAR system of claim 23, wherein the wavelength of the downshifted light beam is in the short-wave infrared (SWIR) region.

26. The 3D UV imaging LADAR system of claim 25, wherein the detector includes a Mercury-Cadmium-Tellurium avalanche photodiode.

* * * * *